(12) United States Patent
Overbeek et al.

(10) Patent No.: US 11,525,061 B2
(45) Date of Patent: Dec. 13, 2022

(54) AQUEOUS CROSSLINKABLE COATING COMPOSITION

(71) Applicant: COVESTRO (NETHERLANDS) B.V., Geleen (NL)

(72) Inventors: Gerardus Cornelis Overbeek, Echt (NL); Alfred Jean Paul Bückmann, Echt (NL); Patrick Johannes Maria Stals, Echt (NL); Daan Van Der Zwaag, Echt (NL); Jurgen Scheerder, Echt (NL); Stella Josette Van Dijk, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 430 days.

(21) Appl. No.: 16/631,289

(22) PCT Filed: Jul. 16, 2018

(86) PCT No.: PCT/EP2018/069322
§ 371 (c)(1),
(2) Date: Jan. 15, 2020

(87) PCT Pub. No.: WO2019/016168
PCT Pub. Date: Jan. 24, 2019

(65) Prior Publication Data
US 2020/0207994 A1 Jul. 2, 2020

(30) Foreign Application Priority Data

Jul. 17, 2017 (EP) .................................. 17181586

(51) Int. Cl.
| | | |
|---|---|---|
| *C09D 7/63* | (2018.01) | |
| *C09D 5/02* | (2006.01) | |
| *C08F 220/06* | (2006.01) | |
| *C08F 220/56* | (2006.01) | |
| *C08F 220/28* | (2006.01) | |
| *C08F 2/22* | (2006.01) | |
| *C08F 212/08* | (2006.01) | |
| *C08F 220/44* | (2006.01) | |
| *C09D 11/107* | (2014.01) | |

(52) U.S. Cl.
CPC .................. *C09D 7/63* (2018.01); *C08F 2/22* (2013.01); *C08F 212/08* (2013.01); *C08F 220/06* (2013.01); *C08F 220/283* (2020.02); *C08F 220/44* (2013.01); *C08F 220/56* (2013.01); *C09D 5/024* (2013.01); *C09D 11/107* (2013.01)

(58) Field of Classification Search
None
See application file for complete search history.

(56) References Cited

U.S. PATENT DOCUMENTS

| | | | | |
|---|---|---|---|---|
| 5,962,571 A | * | 10/1999 | Overbeek | ................. C08F 8/30 523/411 |
| 8,975,332 B2 | * | 3/2015 | Mestach | ............... C08F 265/06 524/745 |
| 2007/0135567 A1 | * | 6/2007 | Ruhoff | ................. C09D 133/14 525/55 |

FOREIGN PATENT DOCUMENTS

| | | |
|---|---|---|
| CN | 101033360 | 9/2007 |
| WO | 95/29963 | 11/1995 |
| WO | 2006/042220 | 4/2006 |
| WO | 2012/140042 | 10/2012 |

OTHER PUBLICATIONS

International Search Report for PCT/EP2018/069322 dated Sep. 6, 2018, 4 pages.
Written Opinion of the ISA for PCT/EP2018/069322 dated Sep. 6, 2018, 6 pages.

* cited by examiner

*Primary Examiner* — Vu A Nguyen
(74) *Attorney, Agent, or Firm* — The Webb Law Firm

(57) ABSTRACT

The current invention relates to an one-pack aqueous coating composition comprising dispersed carbonyl functional vinyl polymer(s) particles, characterized in that the coating composition further comprises carbodihydrazide, whereby (i) the equivalent molar ratio of hydrazide groups to carbonyl groups is from 0.1 to 0.95, (ii) the ratio of number-average molecular weight of the carbonyl functional vinyl polymer(s) to acid value of the carbonyl functional vinyl polymer(s) is higher than 400, and (iii) the acid value of the carbonyl functional vinyl polymer(s) is from 2 to 100 mg KOH/gram carbonyl functional vinyl polymer.

22 Claims, No Drawings

AQUEOUS CROSSLINKABLE COATING COMPOSITION

This application is the U.S. national phase of International Application No. PCT/EP2018/069322 filed Jul. 16, 2018 which designated the U.S. and claims priority to EP Application No. 17181586.3 filed Jul. 17, 2017, the entire contents of each of which are hereby incorporated by reference.

The present invention relates to the field of acrylic polymer compositions especially those useful in the preparation of coatings. In particular, the present invention relates to aqueous coating compositions comprising crosslinkable polymer particles dispersed in an aqueous medium and comprising crosslinking agent.

There is a need in the industry to improve the safety, health and environmental profile of coatings while maintaining or improving the adhesion and resistance level of the materials. Crosslinkable vinyl polymer dispersions with carbonyl functionality and using commonly applied polyhydrazides as crosslinkers have been used to improve the adhesion and resistance level of the materials.

Aqueous coating compositions containing carbonyl functional vinyl polymers which are crosslinked with polyhydrazides like adipic acid dihydrazide are well known. For example, WO95/29963 describes a process for preparing aqueous crosslinkable compositions comprising a) preparing an aqueous solution of an acid-functional oligomer and having crosslinker functional groups; b) conducting an aqueous emulsion polymerization to make an aqueous emulsion of an olefinic hydrophobic polymer in the presence of the aqueous oligomer solution, the hydrophobic polymer optionally having crosslinker functional groups; and c) combining with a crosslinking agent reactable with the crosslinker groups of the oligomer and polymer. Commonly applied polyhydrazides are adipic acid dihydrazide (ADH) and succinic acid dihydrazide (SDH). The crosslinking takes place rapidly at room temperature, especially after the film has been formed from the dispersions. Aqueous coating compositions comprising carbonyl functional vinyl polymers and adipic acid dihydrazide or succinic acid dihydrazide can be effectively applied as a one-pack system without the necessity of mixing reactive materials just prior to application as in a two-pack system. One-pack systems containing the carbonyl functional vinyl polymer and adipic acid dihydrazide or succinic acid dihydrazide usually have good storage stability (long pot-life), resulting in good workability.

A disadvantage of the known crosslinkable vinyl polymer coating compositions is that the polyhydrazide hydrolyzes to a certain extent resulting in the formation of free hydrazine, which is highly toxic and thus very undesirable. The hydrazine in the wet coating, formed by hydrolysis of the hydrazide, will react instantaneously with the available carbonyl groups in the wet dispersion or coating composition, reducing free hydrazine levels to undetectable values. However, this is different in the dried coating. On drying, the pH decreases to the acidic regime, generally to a pH of around 4 because of evaporation of the neutralizing alkali (mostly amines, for instance ammonia). Since a large amount of the carbonyl groups on the polymer backbone will have reacted with the hydrazide crosslinker, fewer carbonyl groups will be available to scavenge the hydrazine that is generated due to hydrolysis of unreacted hydrazide. We have found that if the amount of hydrazide is less than one equivalent on carbonyl, a large excess of unreacted hydrazide is avoided which can hydrolyze after application and drying of the composition (e.g. as a coating or ink) on a substrate. In view of the toxicological profile of hydrazine, the amount of free hydrazine in particular in the final coating must be very low. The scavenging of liberated hydrazine that is formed due to hydrolysis may well result in a low or an unmeasurable level of hydrazine in the coating composition due to the scavenging by the carbonyl groups, however as explained, this is far less the case in a dried coating, where the hydrazine is surrounded by fewer available carbonyl groups and can easily leak out of the film to get released in the environment, like for instance the air or water.

We have now surprisingly found that carbodihydrazide is less prone to hydrolysis than other dihydrazides like adipic acid dihydrazide and succinic acid dihydrazide. Hence, much less toxic hydrazine is formed through the use of carbodihydrazide, compared to using adipic acid dihydrazide or succinic acid dihydrazide. Furthermore, the use of carbodihydrazide will reduce the concerns about the aqua toxicity of which the commonly applied dihydrazides like adipic acid dihydrazide and succinic acid dihydrazide are suffering.

We have however also found that the curing reaction between carbodihydrazide and carbonyl functional vinyl polymers may start immediately after mixing the carbonyl functional vinyl polymer with carbodihydrazide. Hence coating compositions containing carbodihydrazide and carbonyl functional vinyl polymers may have a very short pot life resulting in that a two-pack system is needed, whereby the reactive materials need to be mixed just prior to application, resulting in poor workability. This is described in U.S. Pat. No. 5,821,295. This patent publication describes a resinous composition for a two-pack system comprising (A) a colloidal dispersion or emulsion obtained by solution copolymerization of a monomer mixture comprising a carbonyl group-containing unsaturated monomer, carboxyl-group containing unsaturated monomer and other unsaturated monomers to form a copolymer, neutralizing the copolymer with an alkali, dissolving or emulsifying it into water, and adjusting the pH to above 7, and (B) an easily water soluble dihydrazide compounds having from 1 to 5 carbon atoms like for example carbodihydrazide. U.S. Pat. No. 5,821,295 teaches that the pot-life can be controlled (and hence early reaction of the carbodihydrazide and the carbonyl functional vinyl polymer is avoided) by increasing pH value upwardly. Example 4 reports a pot-life of 3 hours at a pH of 10.5, which is relatively short for a two-pack system, let alone for a one-pack coating composition which usually requires a pot life of at least one year at 25° C.

The object of the present invention is to provide a one-pack aqueous crosslinkable coating composition comprising an aqueous colloidal dispersion of carbonyl functional vinyl polymer and a crosslinking agent that is less prone to hydrolysis than adipic acid dihydrazide and succinic acid dihydrazide.

The object has surprisingly been achieved by an aqueous coating composition comprising carbodihydrazide and an aqueous colloidal dispersion of carbonyl functional vinyl polymer(s), whereby the equivalent molar ratio of hydrazide groups to carbonyl groups is from 0.1 to 0.95; the ratio of number-average molecular weight of the carbonyl functional vinyl polymer(s) to acid value of the carbonyl functional vinyl polymer(s) is higher than 400; and the acid value of the carbonyl functional vinyl polymer(s) is from 2 to 100 mg KOH/gram of the carbonyl functional vinyl polymer.

It has surprisingly been found that the aqueous coating compositions according to the invention provide crosslinkable compositions which can be applied as one-pack systems and whereby the crosslinking agent is less prone to hydrolysis than adipic acid dihydrazide and succinic acid dihydrazide.

As used herein, a one-pack coating composition is a coating composition having a pot life of at least one year at 25° C. Pot life (also referred to as shelf life) is defined as the amount of time it takes for the initial viscosity of a mixture to double, or quadruple for lower viscosity products (<1000 cPs). Timing starts from the moment the product is mixed, and is measured at 25° C. A pot life of at least one year at 25° C. is commonly accepted as being equivalent to a pot-life of four weeks at 50° C.

The present invention relates to an aqueous coating composition comprising carbodihydrazide and an aqueous colloidal dispersion of carbonyl functional vinyl polymer(s), whereby the equivalent molar ratio of hydrazide groups to carbonyl groups is from 0.1 to 0.95; the ratio of number-average molecular weight of the carbonyl functional vinyl polymer(s) to acid value of the carbonyl functional vinyl polymer(s) is higher than 400; and the acid value of the carbonyl functional vinyl polymer(s) is from 2 to 100 mg KOH/gram carbonyl functional vinyl polymer. The equivalent molar ratio of hydrazide groups to carbonyl groups in the coating composition of the invention is from 0.1 to 0.95 and preferably from 0.2 to 0.95. The equivalent molar ratio is calculated by dividing the molar amount of hydrazide groups by the molar amount of carbonyl groups reactive with hydrazide groups. The molar amounts are calculated from the amount of carbonyl functional monomers (i.e. monomers which have at least one carbonyl group reactive with a hydrazide group) which are used for preparing the carbonyl functional vinyl polymer(s) and the amount of carbodihydrazide which is added to the aqueous colloidal dispersion comprising the carbonyl functional vinyl polymer(s). In the present invention carbodihydrazide is considered to have two hydrazide groups. The carbodihydrazide can be incorporated into the invention composition by simple admixture with the aqueous colloidal dispersion of carbonyl functional vinyl polymer(s). The carbodihydrazide can be added as a solid material or as a solution in water.

In this description, the expression "in the range of from . . . to . . . " and the expression "from . . . to . . . " is understood as including the limits cited and also all the intermediate values.

The ratio of number-average molecular weight ($M_n$) of the carbonyl functional vinyl polymer(s) to acid value (AV) of the carbonyl functional vinyl polymer(s) is higher than 400, preferably higher than 600, more preferably higher than 800, even more preferably higher than 1200 and even more preferably higher than 1500. The ratio of number-average molecular weight ($M_n$) of the carbonyl functional vinyl polymer(s) to acid value (AV) of the carbonyl functional vinyl polymer(s) is preferably lower than 1500000, more preferably lower than 800000, even more preferably lower than 400000, even more preferably lower than 50000, even more preferably lower than 10000 and most preferably lower than 5000. (The fraction of a polymer that has been crosslinked during synthesis and that will not dissolve in the solvent used for size exclusion chromatography measurement will be assumed to have an $M_n$ of 1500000.).

As used herein, the number-average molecular weight of the carbonyl functional vinyl polymer(s) is determined by size exclusion chromatography in hexafluoroisopropanol (HFIP): The number-average molecular weight of the carbonyl functional vinyl polymer(s) is measured with three silica modified 7 µm PFG columns at 40° C. on a Waters Alliance 2695 LC system with a Waters 2410 DRI detector and a Waters 2996 PDA detector. Hexafluoroisopropanol (HFIP) and PTFA 0.1% is used as eluent with a flow of 0.8 mL/min. The samples are dissolved in the eluent using a concentration of 5 mg polymer per mL solvent. The solubility is judged with a laser pen after 24 hours stabilization at room temperature; if any scattering is visible the samples are filtered first and 150 µl sample solution is injected. The MMD (molecular mass distribution) results are calculated with 11 narrow poly methylmethacrylate standards from 645-1.677.000 Da.

As used herein, the acid value of the carbonyl functional vinyl polymer(s) is calculated according to the formula AV=((total molar amount of carboxylic acid components included in the carbonyl functional vinyl polymer(s) per gram of total amount of components included in the carbonyl functional vinyl polymer(s)) * 56.1* 1000) and is denoted as mg KOH/gram carbonyl functional vinyl polymer(s). The acid value of the carbonyl functional vinyl polymer(s) can thus be controlled by the molar amount of carboxylic acid components that is used to prepare the carbonyl functional vinyl polymer(s).

The carbonyl functional vinyl polymer(s) has an acid value of at least 2 mg KOH/gram carbonyl functional vinyl polymer. Carbonyl functional vinyl polymers with a lower acid value will usually not be plasticized by water resulting in an increased solvent demand in the coating composition to ensure proper film formation. The carbonyl functional vinyl polymer(s) has an acid value of preferably at least 5 mg KOH/gram carbonyl functional vinyl polymer and more preferably the acid value is at least 9 mg KOH/gram carbonyl functional vinyl polymer. The carbonyl functional vinyl polymer(s) has an acid value of at most 100 mg KOH/gram carbonyl functional vinyl polymer. Carbonyl functional vinyl polymers with a higher acid value will show increased water sensitivity in the coatings derived thereof. The carbonyl functional vinyl polymer(s) preferably has an acid value of at most 80 mg KOH/gram carbonyl functional vinyl polymer and more preferably the acid value is most 75 mg KOH/gram carbonyl functional vinyl polymer. The acid value of the carbonyl functional vinyl polymer(s) is preferably in the range from 5 to 80 mg KOH/gram carbonyl functional vinyl polymer and more preferably in the range from 9 to 75 mg KOH/gram carbonyl functional vinyl polymer.

The coating composition according to the invention preferably comprises carbodihydrazide in an amount of less than 3 wt. % and more than 0.05 wt. %, preferably in an amount of less than 1.5. wt. %, relative to the total amount of monomers charged for the preparation of the carbonyl functional vinyl polymer(s).

Carbodihydrazide has the following structural formula:

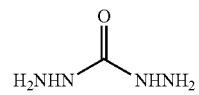

We found that carbodihydrazide gives less hydrolysis at the relevant conditions tested (pH 4 and at temperatures of 30° C. and 50° C.), but that it may also suffer from breaking down in time due to the oxidizing medium of a freshly prepared emulsion where typically strong oxidizing components such as most initiators (including persulphates and peroxides) are used in the process. To further improve the shelf life during storage, we have now found that when an emulsion polymerization process is used wherein the residual initiator level present in the composition after finishing the polymerization is kept to a minimum and more preferred, when the polymeric dispersion after finishing the polymerization is treated by adding reducing agent, like for instance isoascorbic acid or fructose, improved retention of carbodihydrazide is achieved. To avoid or at least reduce oxidation of carbodihydrazide, the finished polymeric dispersion and the coating composition comprising the aqueous colloidal polymeric dispersion should be in a reductive regime which can be established by measuring the redox potential of the dispersion against a Pt/Ag/AgCl (saturated KCl) electrode, calibrated with a+475 mV reference solution according to ASTM D 1498. The lower the redox potential of the dispersion and/or the coating composition the lower the tendency for oxidation of the carbodihydrazide. At pH 7, the redox potential of the aqueous colloidal dispersion of carbonyl functional vinyl polymer(s) (prior to the addition of carbodihydrazide) is preferably<+90 mV, more preferably<+50 mV and most preferably<+10 mV. The redox potential of the aqueous coating composition of the invention (after addition of the carbodihydrazide) is preferably below+32.5 mV, more preferably<+12.5 mV, most preferably<+2.5 mV at pH 7 of the coating composition. This results in an improved retention of the crosslinker and hence to an improved shelf stability. The preferred redox potential value of the aqueous colloidal dispersion of carbonyl functional vinyl polymer(s) (prior to the addition of carbodihydrazide) or the preferred redox potential value of the aqueous coating composition of the invention (after addition of the carbodihydrazide) at a pH of y can be calculated from the redox potential value at a pH of x by the following formula:

Redox potential Rp@pH $y$ in mV is≤[Rp@pHx−((pH($y$)−pHx)*25)]

For example: when at a pH 7, the redox potential is 90, then the redox potential at pH $y$ (say $y$=8) is:

Redox potential Rp@pH $y$ in mV is≤Rp@pHx−((pH($y$)−pHx)*25)=90−25=65.

When at a pH of 8.2, the redox potential is 11, then the redox potential at a pH of 7 is:

Redox potential Rp@pH $y$ in mV is ≤Rp@pHx−((pH($y$)−pHx)*25)

Rp@pH7≤Rp@pHx−((pH($y$)−pHx)*25)=11−((7−8.2)*25)=11−(−30)=41.

By a vinyl polymer is meant generally herein a polymer derived from the addition polymerisation (normally by a free-radical process) of at least one olefinically unsaturated monomer. By a vinyl monomer is therefore meant herein an olefinically unsaturated monomer. By an aqueous colloidal dispersion of carbonyl functional (i.e. carbonyl group containing) vinyl polymer(s) is meant herein a dispersion of the carbonyl functional vinyl polymeric component in a liquid carrier medium of which water is the principal component (at least 50 percent by weight, more usually at least 90 percent by weight of the carrier medium).

The aqueous coating composition according to the invention comprises dispersed carbonyl functional (i.e. containing carbonyl group(s) reactive with a hydrazide group) vinyl polymer particles. The colloidal dispersion of carbonyl functional vinyl polymer particles is preferably obtained by copolymerizing, preferably by emulsion polymerisation of, a monomer mixture comprising carbonyl functional olefinically unsaturated monomer(s), carboxylic acid functional olefinically unsaturated monomer(s) and other olefinically unsatured monomer(s) to form a copolymer, optionally neutralizing the copolymer with a base, and adjusting the pH to a value of at least 6.8. Preferably, the coating composition comprises dispersed anionically stabilized carbonyl functional vinyl polymer particles preferably obtained by effecting an anionic charge reversal of at least a part of the carboxylic acid which is preferably introduced in the carbonyl functional vinyl polymer via the use of carboxylic acid functional olefinically unsaturated monomer(s).

The carbonyl groups are introduced in the vinyl polymer by copolymerizing carbonyl group containing olefinically unsaturated monomers (i.e. containing carbonyl group(s) reactive with a hydrazide group) with at least one other olefinically unsaturated monomer. Preferably, acetoacetoxy (meth)acrylate is not applied for preparing the carbonyl functional vinyl polymer since acetoacetoxy(meth)acrylate results in discoloration upon reaction with hydrazide.

Preferably, the carbonyl groups reactive with a hydrazide group are ketone groups. The ketone groups are introduced in the vinyl polymer by copolymerizing ketone group containing olefinically unsaturated monomers with at least one other olefinically unsaturated monomer. Preferably, the ketone groups are introduced in the vinyl polymer by copolymerizing ketone group containing olefinically unsaturated monomers with at least one carboxylic acid functional olefinically unsaturated monomer and at least one other olefinically unsaturated monomer (different than the ketone group containing olefinically unsaturated monomer(s) and different than the carboxylic acid functional olefinically unsaturated monomer). The ketone group containing olefinically unsaturated monomers are preferably selected from the group consisting of methacrolein, acrolein, diacetone acrylamide, vinyl methyl ketone, vinyl ethyl ketone, vinyl butyl ketone, and any mixture thereof. More preferably, the carbonyl groups are introduced in the vinyl polymer by copolymerizing of diacetone acrylamide with at least one other olefinically unsaturated monomer. Even more preferably, the carbonyl groups are introduced in the vinyl polymer by copolymerizing of diacetone acrylamide with at least one carboxylic acid functional olefinically unsaturated monomer and at least one other olefinically unsaturated monomer (different than the carbonyl group containing olefinically unsaturated monomer(s) and different than the carboxylic acid functional olefinically unsaturated monomer). For the sake of clarity, diacetone acrylamide has one carbonyl group, i.e. one ketone group, reactive with a hydrazide group. As known in the art, carboxylic acid groups, carboxylic acid ester groups and amide groups are not carbonyl groups reactive with hydrazide groups.

The amount of carbonyl functional olefinically unsaturated monomer(s), based on the total amount of monomers used to prepare the carbonyl functional vinyl polymer, is generally from 0.1 to 20 wt. %. The amount of carbonyl functional olefinically unsaturated monomer(s), based on the total amount of monomers used to prepare the carbonyl functional vinyl polymer, is preferably less than 15 wt. %, more preferably less than 8 wt. % and most preferably less than 5 wt. % in order to minimalize water sensitivity of the coating. The amount of carbonyl functional olefinically unsaturated monomer(s), based on the total amount of monomers used to prepare the carbonyl functional vinyl polymer, is preferably at least 0.3 wt. %, more preferably at least 0.5 wt. %, more preferably at least 1 wt. % and most preferably at least 2 wt. %. Preferably at least 60 wt. % of all polymer chains do contain copolymerized carbonyl functional monomer, and more preferably all monomer phases added to the reactor during the synthesis of the polymer do contain at least 0.3 wt. % on monomer of a carbonyl functional monomer (this to obtain a well crosslinked network after drying of the coating), more preferred this carbonyl functional monomer is diacetone acrylamide.

The carboxylic acid functional olefinically unsaturated monomer(s) are preferably selected from the group consisting of acrylic acid, methacrylic acid, and R-carboxyethyl acrylate, citraconic acid, crotonic acid, fumaric acid, itaconic acid, monoalkyl esters of itaconic acid such as for example monomethyl itaconate, maleic acid, and potentially carboxylic acid functional olefinically unsaturated monomers such as itaconic anhydride or maleic anhydride, and combinations thereof; more preferably the carboxylic acid functional olefinically unsaturated monomer is acrylic acid, methacrylic acid, β-carboxyethyl acrylate and mixtures thereof. Most preferred carboxylic acid functional olefinically unsaturated monomer is methacrylic acid.

The other olefinically unsaturated monomer(s) (i.e. those different than the carbonyl group containing olefinically unsaturated monomer(s) and different than the carboxylic acid functional olefinically unsaturated monomer(s)) preferably include olefines such as ethylene or propylene; vinyl halides such as vinylidene chloride and vinyl chloride; olefinically unsaturated amides; vinyl esters; vinyl ethers; olefinically unsaturated nitriles; heterocyclic vinyl compounds; diesters of fumaric and maleic acid; and, in particular, esters of acrylic acid and methacrylic acid of formula:

$$CH_2=CR^4CO_2R^5 \quad (1)$$

where $R^4$ is H or methyl and $R^5$ is optionally substituted alkyl of 1 to 20 carbon atoms (more preferably 1 to 8 carbon atoms) or cycloalkyl of 5 to 12 ring carbon atoms. More specific examples of such monomers include alkylesters such as methyl acrylate, ethyl acrylate, n-propyl acrylate, n-butyl acrylate, i-butyl acrylate, t-butyl acrylate, n-octyl acrylate, 2-ethylhexyl acrylate, lauryl acrylate, isopropyl acrylate, cyclohexyl acrylate, methyl methacrylate, ethyl methacrylate, n-propyl methacrylate, isopropyl methacrylate, n-butyl methacrylate, i-butyl methacrylate, t-butyl methacrylate, cyclohexyl methacrylate, 2-ethylhexyl methacrylate, octyl methacrylate, lauryl methacrylate, diethyl maleate, diethyl fumarate; vinyl esters such as allyl acetate, allyl chloroacetate, methallyl acetate, vinyl acetate, isopropenyl acetate; halides such as vinyl chloride, vinylidene chloride, allyl chloride, 1,2-dichloropropene-2, methallyl chloride and trichloroethylene; nitriles such as acrylonitrile and methacrylonitrile; aryls such as styrene, a-methyl styrene, o-methyl styrene, m-methyl styrene, p-methyl styrene, pentachlorostyrene, o-chlorostyrene, m-chlorostyrene, p-chlorostyrene and p-cyanostyrene; conjugated dienes or chlorodienes such as butadiene and chloroprene; hydroxy functional alkyl (preferably 1 to 18C) (meth)acrylates such as 2-hydroxyethyl acrylate, 2-hydroxyethyl methacrylate, 2-hydroxy-n-propyl acrylate, 2-hydroxy-n-propyl methacrylate, 3-hydroxy-n-propyl methacrylate, 3-hydroxy-n-propyl acrylate, 4-hydroxy-n-butyl acrylate, 4-hydroxy-n-butyl methacrylate, hydroxystearyl acrylate, hydroxystearyl methacrylate; dihydroxy alkyl (preferably 1 to 6C) adducts of maleic acid, fumaric acid, and phthalic acid; polyethylene oxide or polypropylene oxide functionalised hydroxyl functional (meth)acrylates. It is to be understood that all the above monomers in this paragraph exclude carbonyl group-containing olefinically unsaturated monomers and carboxylic acid olefinically unsaturated monomers. The other olefinically unsaturated monomer(s) (i.e. those different than the carbonyl group containing olefinically unsaturated monomer(s) and different than the carboxylic acid functional olefinically unsaturated monomer(s)) are preferably used in an amount within the range of from 78 to 98 weight percent based on the total amount of monomers used to prepare the carbonyl functional vinyl polymer, more preferably from 83 to 97 weight percent. (It is to be understood the weight percent of all monomers used to prepare the carbonyl functional vinyl polymer must add up to 100). For reasons of water resistance, preferably less than 20 wt %, based on the total amount of monomers used to prepare the carbonyl functional vinyl polymer, of vinyl acetate (and saponified vinyl acetate) is used, more preferred less than 5 wt % and most preferred 0 wt. % is used. Preferably the amount of non-ionic (so not containing a ionizable group) monomers that contribute to the water solubility of the carbonyl functional vinyl polymer, including for example (meth)acrylamide, hydroxyethyl(meth)acrylate, polyethylene glycol (400) diacrylate, polyethylene glycol (600) diacrylate, ethyldiglycolacrylate, and hydroxybutyl acrylate, is preferably less than 15 wt %, more preferred less than 6 weight % and most preferred less than 3 weight %, based on the total amount of monomers used to prepare the carbonyl functional vinyl polymer.

In a preferred embodiment, the carbonyl functional vinyl polymer is preferably obtained by copolymerizing a monomer mixture comprising from 70 to 98 weight %, more preferably from 80 to 97 weight % and most preferably from 85 to 96 weight % of styrene, acrylonitrile and/or alkyl (meth)acrylate monomers where the alkyl has a chain length of 1-11 carbons, based on the total amount of monomers used to prepare the carbonyl functional vinyl polymer. Most preferred the carbonyl functional vinyl polymers of the composition is obtained by copolymerizing a monomer mixture consisting of (i) diacetone acrylamide, (ii) (meth)acrylic acid and/or betacarboxyethylacrylate, (iii) styrene, acrylonitrile and/or alkyl(meth)acrylate monomers where the alkyl has a chain length of 1-11 carbons and (iv) optionally other monomers, where the total amount of other monomers is less than 5 weight %, more preferred less than 2 weight %, based on the total amount of monomers used to prepare the carbonyl functional vinyl polymer.

It is preferred that the average particle size of the carbonyl functional vinyl polymer(s) is within the range of from 20 to 500 nm, more preferably from 40 to 250 nm and most preferably from 50 to 150 nm. (Average particle size herein is that as determined by light scattering using a Malvern Zetasizer 3000 HSa).

The carbonyl functional vinyl polymer(s) has an average glass transition temperature (Tg) within the range of from −50° C. to 120° C. Below −50° C. the resulting coating is not likely in some applications to have sufficient chemical resistance, and above 120° C. the coating compositions may require in some applications an undesirably large amount of coalescent (a coalescent is an organic solvent or plasticizer that lowers the minimum film forming temperature of a polymer, thereby permitting a coating from the polymer to form a useful film at a temperature below the Tg of the polymer) which will detract from the coating properties. The average Tg of the carbonyl functional vinyl polymer(s) is more preferably in the range of from 0 to 60° C., even more preferably in the range of from 5 to 60° C. The average Tg of the carbonyl functional vinyl polymer(s) is preferably lower than 50° C. and more preferably lower than 40° C. As is well known, the Tg of a polymer is that temperatures at which the polymer changes from a rubbery, elastic state to a glassy, brittle state. Tg values may be determined experimentally using, inter alia, differential scanning calorimetry DSC, or calculated using the well-known Fox equation.

Calculation of the Tg by means of the Fox equation is done as follows. The Tg, in Kelvin, of a copolymer having "n" copolymerised comonomers is given by the weight fractions W of each comonomer type and the Tg's of the homopolymers (in Kelvin) derived from each comonomer according to the equation:

$$\frac{1}{Tg} = \frac{W_1}{Tg_1} + \frac{W_2}{Tg_2} + \ldots + \frac{W_n}{Tg_n}$$

The calculated Tg in Kelvin may be readily converted to ° C.

The colloidal dispersion of carbonyl functional vinyl polymer(s) is preferably obtained by emulsion polymerization using conventional emulsion polymerisation conditions. Methods for preparing vinyl polymers by emulsion polymerization are known in the art and are described in for example Handbook Emulsion Polymerization: Theory and Practice, 1975, by D. C. Blackley (ISBN 978-0-85334-627-2). The emulsion polymerization to obtain carbonyl functional vinyl polymer(s) is a free-radical emulsion polymerization that is conducted using appropriate heating and agitation (stirring). The free-radical emulsion polymerization is usually effected at atmospheric pressure and a temperature in the range from 30 to 100° C. Suitable free-radical-yielding initiators include persulphates such as ammonium, K and Na salts of persulphate, or redox initiator systems; combinations such as t-butyl hydroperoxide or hydrogen peroxide or cumene hydroperoxide, with isoascorbic acid or sodium formaldehydesulphoxylate, and optionally FeEDTA are useful. The amount of initiator, or initiator system, is generally 0.05 to 3 wt. % based on the weight of total monomers charged. The molecular weight $M_n$ of the carbonyl functional vinyl copolymer(s) can be controlled by the use of well-known chain transfer agents. Preferred chain transfer agents can include mercaptanes and alkyl halogenides. More preferred, the chain transfer agent is selected from the group of lauryl mercaptane, n-dodecyl mercaptane, 3-mercapto propionic acid, i-octyl thioglycolate, mercaptoethanol, tetrabromo methane, or tribromo methane. Most preferred the chain transfer agent is a mercaptane, selected from the group of lauryl mercaptane, 3-mercapto propionic acid, n-dodecyl mercaptane, i-octyl thioglycolate, and/or mercaptoethanol.

An emulsion polymerisation process used for making the colloidal dispersion of carbonyl functional vinyl polymer(s) may be carried out using an "all-in-one" batch process (i.e. a process in which all the materials to be employed are present in the polymerisation medium at the start of polymerisation) or a semi-batch process in which one or more of the materials employed (usually at least one of the monomers), is wholly or partially fed to the polymerisation medium during the polymerisation. In particular, the carbonyl functional vinyl polymer may be made using a single monomer feed containing all or substantially all the monomers for the polymerisation, or two or more monomer feeds (usually just two) may be used in which some of the monomers for the polymerisation are in one of the feeds and the other monomers are in the other feed (or feeds). Such multi feeds may be fed to the polymerisation at the same time or may be added sequentially. In another variant, one of the feeds is fed to another feed while the latter is itself being fed to the polymerisation (this being known in the art as a "powerfeed" process).

Preferably, from 0.1 to 8 wt. %, more preferably from 0.3 to 5 wt. % and most preferably from 0.5 to 3 wt % of surfactant is used based on total amount of monomers charged for the preparation of the carbonyl functional vinyl polymer(s). Preferred surfactants include the alkali metal and ammonium salts of anionic types like sulphates, sulphonates, sulphosuccinates, and phosphates and surfactants which have both anionic groups as well as a nonionic (like polyoxyethylene and/or polyoxypropylene) block. Due to toxicity reasons nonylphenol based surfactants are less preferred.

The emulsion polymerisation is preferably generally performed under acidic conditions, i.e. pH<7, although performing the polymerisation can also be done at higher pH. Preferably, pH is raised at the end of the polymerisation process. This can be done with (organic) amines and/or with inorganic bases. Examples of such bases include organic amines such as trialkylamines (e.g. triethylamine, tributylamine), morpholine and alkanolamines, and inorganic bases such as ammonia, NaOH, KOH, and LiOH. Of course, the aqueous medium containing the carbonyl functional vinyl polymer may already be alkaline (or sufficiently alkaline) such that the acid groups (such as carboxyl groups) become neutralized without the requirement for positively adding a base to raise pH, or the acid groups may be or include very strong acid groups such as sulphonic acid groups (pKa 1 to 2) so that neutralization may not be necessary. Further still, it is possible for acid monomers to be polymerised in salt form rather than as the free acid. Ammonia is most preferred as neutralisation agent.

For optimization of the pot life of the one-pack coating composition, the pH of the coating composition of the invention is preferably above 7, more preferably above 7.5 and most preferably above 8. Preferably the pH of the coating composition of the invention is at most 10 and more preferably at most 9.5. Preferably ammonia is used as main neutralizing agent, with main meaning that more equivalents of ammonia are used than of other neutralizing agent in the total neutralizing agent mixture. Most preferred ammonia is the only neutralizing agent added after completion of the emulsion polymerization. Customers prefer to use coatings with a low odor content and therefore it is preferred to use relatively low levels of volatile amines. A pH above 10 is less desirable, especially when tertiary amines like dimethyl ethanolamine and triethyl amine are used to obtain these high pH values due to their toxicity, while ammonia will give a penetrant odor at pH levels above this value. An additional advantage of using coating compositions with a pH lower than 10 is that a part of the crosslinking is believed to already take place after combining the dihydrazide with the carbonyl functional polymer. This will give some crosslinking inside the particles and we have surprisingly found that this does not interfere with the film formation process after application of the composition on a surface. The crosslinking during storage leads to less free hydrazide groups during storage of the coating composition and this means that the chances of hydrolysis of the hydrazide during storage are further being reduced.

The aqueous colloidal dispersion of the carbonyl functional vinyl polymer(s) preferably has a polymer solids content within the range of from 20 to 60 weight percent (more preferably 25 to 55 weight percent).

The coating compositions may contain other ingredients, additives or auxiliaries, such as coalescents, pigments, dyes, emulsifiers (surfactants), pigment dispersion aids, crosslinking catalysts, levelling agents, waxes, matting agents, anticratering agents, antifoam agents, thickeners, sedimentation inhibitors, heat stabilisers, UV absorbers, antioxidants, and fillers.

The incorporation of coalescents into the composition would for the purpose of optimising or fine-tuning film-forming properties, usually being present in an amount of 0 to 55 weight percent, more preferably 1 to 20 weight percent, still more preferably 2-10 weight percent, based on the weight of the aqueous colloidal dispersion of the carbonyl functional vinyl polymer(s). Examples of suitable coalescents include dipropylene glycol mono n-butyl ether, dipropylene glycol mono methyl ether, butyl glycol, ethylene diglycol, and 2,2,4-trimethyl-1,3-pentene diol monoisobutylate. Such other ingredients, additives and auxiliaries are usually best incorporated into the the aqueous colloidal dispersion before the addition of carbodihydrazide.

The coating compositions once applied may be allowed to dry naturally at ambient temperature, and/or the drying process may be accelerated by heat. Crosslinking can be developed by allowing to stand for a prolonged period at ambient temperature (e.g. several days) and/or by heating at an elevated temperature (e.g. from 50° C. to 160° C.) for a much shorter period of time (in which case the drying and crosslink development steps can be combined into one operation if desired). By ambient temperature in this specification is meant for practical purposes a temperature within the range of from 15 to 30° C.

The present invention further relates to the use of an aqueous colloidal dispersion comprising dispersed carbonyl functional vinyl polymer(s) particles for preparing the one-pack aqueous coating composition as defined above by mixing carbodihydrazide and the aqueous colloidal polymeric dispersion, whereby the amount of carbodihydrazide and carbonyl groups present in the coating composition is such as to result in an equivalent molar ratio of hydrazide groups to carbonyl groups from 0.1 to 0.95, whereby the ratio of number-average molecular weight of the carbonyl functional vinyl polymer(s) to acid value of the carbonyl functional vinyl polymer(s) is higher than 400, and the acid value of the carbonyl functional vinyl polymer(s) is from 2 to 100 mg KOH/gram carbonyl functional vinyl polymer.

There is also provided according to the invention a method of coating a substrate which method comprises applying a coating composition as defined above to a substrate, causing or allowing the aqueous carrier medium of the composition to be removed, and developing crosslinking of the coating that has been applied to the substrate.

There is further provided according to the invention a crosslinked coating which has been derived from a coating composition as defined above.

There is further provided according to the invention a coated substrate which has been prepared by applying a coating composition as defined above to a substrate, causing or allowing the aqueous carrier medium of the composition to be removed, and developing crosslinking of the coating that has been applied to the substrate. The substrate is preferably selected from the group consisting of
  a) plastic films such as polypropylene, polyethylene, polyester, polyamide, PVC, polycarbonate, polystyrene, polyurethane, PET, biaxially oriented polypropylene and biaxially oriented PET plastic films,
  b) leather, artificial leather; natural and woven synthetic fabrics such as cotton, wool, rayon; non-woven fabrics,
  c) metal substrates like aluminum and vacuum metalized plastic substrates,
  d) wood,
  e) paper, and
  g) a combination of a), b), c), d) and/or e).

The coating composition of this invention can be used for obtaining a traditional coating and is preferably used as an ink or overprint varnish. The present invention therefore further relates to an ink comprising a coating composition as described above or obtained with the process to prepare the coating composition as described above and a colorant. The present invention further relates a process for printing, preferably gravure and flexo printing, an image on a substrate comprising applying such an ink.

The present invention is now illustrated by the following examples. Unless otherwise specified all parts, percentages, and ratios are on a weight basis.

EXAMPLES

Example 1

The hydrolytic stability of dihydrazides was determined by dissolving 1.00 g of dihydrazide (adipic dihydrazide, succinic dihydrazide and carbodihydrazide) in 100 mL of demineralized water in a closed container. The pH of the solution (~7.5) was adjusted to pH 4 by addition of 1 M HCl. The closed containers were stored at 30° C. and 50° C.

At regular intervals, a sample was taken from this mother-solution and analyzed for its free hydrazine content. The sample (0.1 mL) was mixed with 0.95 mL of a 9:1 water/acetone mixture and thoroughly mixed for 30 minutes. Next the amount of acetone ketazine (obtained by reaction of acetone and hydrazine) was determined by HPLC. Hydrazine was calibrated externally with a hydrazine in water solution prepared from hydrazinesulphate, that was derivatized analogously to the above-mentioned procedure. A standard 5-point calibration from 0.03 mg/mL up to 4 mg/mL was used for the samples with a low concentration and up to 100 mg/mL was used for the samples with a high concentration of acetone ketazine.

Acetone ketazine was measured on a Waters Acquity H-Class UPLC with UV detection: 100 mm T3 column at 40° C., 1 µL injection, 0.4 mL/min flow, UV detection at 240 nm, $H_2O$ to acetonitrile gradient.
$H_2O$-Acetonitrile gradient:

| t 0   | 99% H2O |
| t 1   | 99% H2O |
| t 5   | 60% H2O |
| t 5.1 | 1% H2O  |

TABLE 1

Analysis of the amount of hydrazine formation in 1% dihydrazide solution in water (pH 4, 30° c.) (ppm, +/−1 ppm)

| pH 4, 30° C. | 16 hours | 60 hours | 84 hours | 108 hours | 132 hours |
| --- | --- | --- | --- | --- | --- |
| CDH | 1 | 0 | 0 | 0 | 0 |
| ADH | 2 | 6 | 7 | 9 | 11 |
| SDH | 168 | 490 | 484 | 540 | 611 |

TABLE 2

Analysis of the amount of hydrazine formation in 1% dihydrazide solution in water (pH 4, 50° c.) (ppm, +/−1 ppm)

| pH 4, 50° C. | 60 hours | 84 hours | 108 hours |
| --- | --- | --- | --- |
| CDH | 8 | 5 | 10 |
| ADH | 44 | 51 | 62 |
| SDH | 2244 | 2170 | 2260 |

Example 2

In a four-necked reactor equipped with stirrer, condenser and thermocouple, a reactor phase consisting of 2 parts of sodium lauryl sulphate in 415 parts of demineralized water was heated to 70° C. under nitrogen atmosphere. At a temperature of 70° C., 10% of an emulsified monomer feed, constituted as described in the table below, was added.

TABLE 3

| | |
|---|---|
| Demineralized water | 160 parts |
| Sodium lauryl sulphate | 5 parts |
| 3-Mercaptopropionic acid | 5 parts |
| Methacrylic acid | 3 parts |
| Methyl methacrylate | 386 parts |
| n-Butyl acrylate | 30 parts |
| Diacetone acrylamide | 18 parts |

After heating to a temperature of 75° C., 30% of an initiator feed consisting of 2 parts of ammonium persulphate in 90 parts of demineralized water was added. Subsequently the reactor was heated to a temperature of 85° C. and monomer and initiator feeds were started. The monomer feed contained the remaining 90% of the aforementioned monomeric emulsion and was added over 50 minutes, while the remaining 70% of the initiator feed was added over 60 minutes. After feed conclusion, the vessels were rinsed with demineralized water. The reaction temperature of 85° C. was maintained for 20 minutes, after which the reactor contents were cooled to 25° C. and the pH brought to 8-8.6 with 12.5% v/v aqueous ammonia. After 30 minutes of mixing, 4 parts of CDH were added, rinsed with 20 parts of demineralized water and mixed for a further 5 minutes.

The molar ratio of hydrazide to carbonyl groups is 0.83, the number average molecular weight ($M_n$) as determined by gel permeation chromatography was 6.7E3 Da and the calculated acid value (AV) amounted to 10 mg KOH/g solids. This results in an $M_n$/AV ratio of 670.

Initial viscosity measurement yields a value of 4 mPa·s, and after aging at 50° C. for 4 weeks a value of 4 mPa·s is measured.

Example 3

Example 2 was repeated, but using the monomer composition as given in Table 4.

TABLE 4

| | |
|---|---|
| Demineralized water | 160 parts |
| Sodium lauryl sulphate | 5 parts |
| 3-Mercaptopropionic acid | 5 parts |
| Methyl methacrylate | 389 parts |
| n-Butyl acrylate | 30 parts |
| Diacetone acrylamide | 18 parts |

The molar ratio of hydrazide to carbonyl groups is 0.83, the number average molecular weight ($M_n$) as determined by gel permeation chromatography was 6.9E3 Da and the calculated acid value (AV) amounted to 6 mg KOH/g solids. This results in an $M_n$/AV ratio of 1150.

Initial viscosity measurement yields a value of 5 mPa·s, and after aging at 50° C. for 4 weeks a value of 3 mPa·s is measured.

Example 4

In a four-necked reactor equipped with stirrer, condenser and thermocouple, a reactor phase consisting of 1 part of sodium lauryl sulphate in 185 parts of demineralized water was heated to 70° C. under nitrogen atmosphere. At a temperature of 70° C., 10% of an emulsified monomer feed, constituted as described in the table below, was added.

TABLE 5

| | |
|---|---|
| Demineralized water | 75 parts |
| Sodium lauryl sulphate | 3 parts |
| 3-Mercaptopropionic acid | 3 parts |
| Methacrylic acid | 29 parts |
| Methyl methacrylate | 171 parts |
| n-Butyl acrylate | 15 parts |
| Diacetone acrylamide | 9 parts |

After heating to a temperature of 75° C., 30% of an initiator feed consisting of 2 parts of ammonium persulphate in 90 parts of demineralized water was added. Subsequently the reactor was heated to a temperature of 85° C. and monomer and initiator feeds were started. The monomer feed contained the remaining 90% of the aforementioned monomeric emulsion and was added over 50 minutes, while the remaining 70% of the initiator feed was added over 60 minutes. After feed conclusion, the vessels were rinsed with demineralized water. The reaction temperature of 85° C. was maintained for 20 minutes, after which the reactor contents were cooled to 25° C., 330 parts of demineralized water and 10 parts of 12.5% v/v aqueous ammonia were added. After stirring for 15 minutes, the reaction mixture was stored overnight.

For the second phase of the synthesis, the reactor was heated to 55° C. A monomer feed with the composition as given in Table 6 was prepared.

TABLE 6

| | |
|---|---|
| Demineralized water | 40 parts |
| n-Butyl acrylate | 550 parts |
| Diacetone acrylamide | 11 parts |

Additionally, an oxidator solution of 0.2 parts t-butylhydroperoxide in 4 parts demineralized water was prepared, as well as a reductor solution of 0.1 parts isoascorbic acid in 7 parts demineralized water. The latter was brought to pH 7-8 with 12.5% v/v aqueous ammonia. At 55° C., 33% of the monomer feed was added to the reactor in 8 minutes, followed by a 15-minute mixing period. Then 75% of the oxidator solution was added to the reactor, followed by 75% of the reductor solution. After completion of the exotherm and 10 minutes of temperature drift, 112 parts of demineralized water were added and the reactor cooled to 55° C. Subsequently, 0.01 parts of Fe(III)EDTA were added, followed by another 33% of the monomer feed over 8 minutes. After completion of the exotherm and 10 minutes drifting, another 112 parts of demineralized water were added and the reactor cooled to 55° C. The remaining monomer feed was added, rinsed with 25 parts of water and mixed for 15 minutes. Then, the remaining oxidator and reductor solutions were added, resulting in an exotherm. After completion, the reactor was stirred at 70° C. for 10 minutes, a solution of 0.06 parts t-butylhydroperoxide in 2 parts demineralized water was added, and a solution of 005 parts isoascorbic acid in 3 parts demineralized water brought to pH 7-8 with 12.5% v/v aqueous ammonia was added. After mixing for another 30 minutes at 70° C., the reactor was cooled to room temperature. The pH was brought to 8-8,6 with 12,5% v/v aqueous ammonia and after 30 minutes mixing, 4,5 parts of CDH were added, rinsed with 20 parts of demineralized water and mixed for a further 5 minutes.

The molar ratio of hydrazide to carbonyl groups is 0.85, the number average molecular weight as determined by gel permeation chromatography was 1.54E4 Da and the calculated acid value (AV) amounted to 10 mg KOH/g solids. This results in an $M_n/AV$ ratio of 1540.

Initial viscosity measurement yields a value of 77 mPa·s, and after aging at 50° C. for 4 weeks a value of 95 mPa·s is measured.

Physicochemical performance of the films cast from these compositions remained intact after this aging period, as shown using MEK-rubs. For this test, the composition as synthesized in Example 4 was applied to an untreated glass plate using 100 μm wire rod applicators (Test 4a-1). For reference, films were also cast from the same composition lacking a crosslinker (Test 4a-2). The films were incubated at 50° C. for 1 hour, then further dried for 16 hours at 25° C. Subsequently, MEK-rubs were performed in triplicate using a SDL Atlas CM-5 AATCC Crockmeter with butanone (MEK) as the solvent and a probe weight of 9 N. The table below indicates the number of MEK-rubs required to break through the film.

TABLE 7

Physicochemical performance

| Sample | Average MEK-rubs (before aging) | Average MEK-rubs (after aging) |
|---|---|---|
| Test 4a-1 | 9 | 9 |
| Test 4a-2 | 3 | 3 |

Performance of the CDH-crosslinked binders was compared to an ADH-crosslinked benchmark using spot tests. For these tests, the composition as synthesized in Example 4 (before aging) was applied to Leneta test cards using 100 μm wire rod applicators (Test 4b-1). For reference, films were also cast from the same composition except using adipic acid dihydrazide ADH (the same amount on a molar basis as CDH) as a crosslinker (instead of carbodihydrazide CDH) (Test 4b-2) and from the same composition lacking a crosslinker (Test 4b-3). The films were incubated at 50° C. for 1 hour, then further dried for 16 hours at 25° C. Subsequently, a piece of cotton wool was soaked in 1:1 EtOH : demineralized water and placed on the film for 1 hour. After removal of the EtOH and 30 minutes recovery, the following results were obtained (a score of 1 indicates complete degradation of the film, 5 indicates no damage visible), see Table 8.

TABLE 8

Ethanol spot test

| Sample | Score |
|---|---|
| Test 4b-1 | 4 |
| Test 4b-2 | 4 |
| Test 4b-3 | 2 |

Example 5

In a four-necked reactor equipped with stirrer, condenser and thermocouple, a reactor phase consisting of 2 parts of sodium laureth (12 EO) sulphate in 750 parts of demineralized water was heated to 80° C. under nitrogen atmosphere. At a temperature of 80° C., 10% of an emulsified monomer feed, constituted as described in the table below, was added.

TABLE 9

| Demineralized water | 350 parts |
|---|---|
| Sodium laureth (12 EO) sulphate | 15 parts |
| n-Dodecyl mercaptan | 1.5 parts |
| Methacrylic acid | 60 parts |
| n-Butyl methacrylate | 650 parts |
| Ethyl acrylate | 50 parts |
| Diacetone acrylamide | 25 parts |

Subsequently, an initiator feed consisting of 3 parts of ammonium persulphate in 13 parts of demineralized water was added. After completion of the exotherm, the reactor was heated to a temperature of 82° C. and stirred for 5 minutes. The monomer feed contained the remaining 90% of the aforementioned monomeric emulsion and was then added over 90 minutes. After feed conclusion, the vessels were rinsed with demineralized water. The reaction temperature of 82° C. was maintained for 15 minutes, after which the reactor contents were cooled to 60°. Then, a solution of 1,3 parts t-butylhydroperoxide in 13 parts demineralized water was added, followed by addition over 45 minutes of a solution of 1 part Bruggolite FF6 in 17 parts demineralized water. After mixing for another 15 minutes at 60° C., the reactor was cooled to room temperature. The pH was brought to 8-8.6 with 12.5% v/v aqueous ammonia and after 30 minutes mixing, 6 parts of CDH were added, rinsed with 25 parts of demineralized water and mixed for a further 5 minutes.

The molar ratio of hydrazide to carbonyl groups is 0.90, the number average molecular weight as determined by gel permeation chromatography was 2.61E4 Da and the calculated acid value (AV) amounted to 50 mg KOH/g solids. This results in an $M_n/AV$ ratio of 522.

Initial viscosity measurement yields a value of 14 mPa·s, and after aging at 50° C. for 4 weeks a value of 14 mPa·s is measured.

Example 6

Example 5 was repeated, using the monomer composition as described in the table below.

TABLE 10

| Demineralized water | 350 parts |
|---|---|
| Sodium laureth (12 EO) sulphate | 15 parts |
| n-Dodecyl mercaptan | 1.5 parts |
| Methacrylic acid | 30 parts |
| n-Butyl methacrylate | 680 parts |
| Ethyl acrylate | 50 parts |
| Diacetone acrylamide | 25 parts |

The molar ratio of hydrazide to carbonyl groups is 0.90, the number average molecular weight as determined by gel permeation chromatography was 2.25E4 Da and the calculated acid value (AV) amounted to 25 mg KOH/g solids. This results in an $M_n/AV$ ratio of 900.

Initial viscosity measurement yields a value of 10 mPa·s, and after aging at 50° C. for 4 weeks a value of 11 mPa·s is measured.

Comparative Experiment 1

In a four-necked reactor equipped with stirrer, condenser and thermocouple, a reactor phase consisting of 2 parts of sodium lauryl sulphate in 395 parts of demineralized water was heated to 70° C. under nitrogen atmosphere. At a temperature of 70° C., 10% of an emulsified monomer feed, constituted as described in the table below, was added.

TABLE 11

| Demineralized water | 170 parts |
| --- | --- |
| Sodium lauryl sulphate | 6 parts |
| 3-Mercaptopropionic acid | 6 parts |
| Methacrylic acid | 127 parts |
| Methyl methacrylate | 300 parts |
| n-Butyl acrylate | 32 parts |
| Diacetone acrylamide | 20 parts |

After heating to a temperature of 75° C., 30% of an initiator feed consisting of 2,5 parts of ammonium persulphate in 100 parts of demineralized water was added. Subsequently the reactor was heated to a temperature of 85° C. and monomer and initiator feeds were started. The monomer feed contained the remaining 90% of the aforementioned monomeric emulsion and was added over 50 minutes, while the remaining 70% of the initiator feed was added over 60 minutes. After feed conclusion, the vessels were rinsed with demineralized water. The reaction temperature of 85° C. was maintained for 20 minutes, after which the reactor contents were cooled to 25° C. After cooling, 700 parts of demineralized water were added and the pH was brought to 8-8.6 with 12.5% v/v aqueous ammonia. After 30 minutes mixing, 4.5 parts of CDH were added, rinsed with 20 parts of demineralized water and mixed for a further 5 minutes.

The molar ratio of hydrazide to carbonyl groups is 0.85, the number average molecular weight as determined by gel permeation chromatography was 5.76E3 Da and the calculated acid value (AV) amounted to 176 mg KOH/g solids. This results in an $M_n$/AV ratio of 33.

Initial viscosity measurement yields a value of 5.4E2 mPa·s, and after aging at 50° C. for 1 day a value of 2.3E3 mPa·s is measured, which indicates the end of pot life.

Comparative Experiment 2

In a four-necked reactor equipped with stirrer, condenser and thermocouple, a reactor phase consisting of 2 parts of sodium lauryl sulphate in 560 parts of demineralized water was heated to 70° C. under nitrogen atmosphere. At a temperature of 70° C., 10% of an emulsified monomer feed, constituted as described in the table below, was added.

TABLE 12

| Demineralized water | 200 parts |
| --- | --- |
| Sodium lauryl sulphate | 6 parts |
| 3-Mercaptopropionic acid | 7 parts |
| Acrylic acid | 55 parts |
| Methacrylic acid | 18 parts |
| Methyl acrylate | 345 parts |
| Methyl methacrylate | 100 parts |
| n-Butyl acrylate | 38 parts |
| Diacetone acrylamide | 23 parts |

After heating to a temperature of 75° C., 30% of an initiator feed consisting of 2,5 parts of ammonium persulphate in 100 parts of demineralized water was added. Subsequently the reactor was heated to a temperature of 85° C. and monomer and initiator feeds were started. The monomer feed contained the remaining 90% of the aforementioned monomeric emulsion and was added over 50 minutes, while the remaining 70% of the initiator feed was added over 60 minutes. After feed conclusion, the vessels were rinsed with demineralized water. The reaction temperature of 85° C. was maintained for 20 minutes, after which the reactor contents were cooled to 25° C. After cooling, 700 parts of demineralized water were added and the pH was brought to 8-8.6 with 12.5% v/v aqueous ammonia. After 30 minutes mixing, 4.5 parts of CDH were added, rinsed with 20 parts of demineralized water and mixed for a further 5 minutes.

After heating to a temperature of 75° C., 30% of an initiator feed consisting of 2,5 parts of ammonium persulphate in 100 parts of demineralized water was added. Subsequently the reactor was heated to a temperature of 85° C. and monomer and initiator feeds were started. The monomer feed contained the remaining 90% of the aforementioned monomeric emulsion and was added over 50 minutes, while the remaining 70% of the initiator feed was added over 60 minutes. After feed conclusion, the vessels were rinsed with demineralized water. The reaction temperature of 85° C. was maintained for 20 minutes, after which the reactor was cooled to 70° C., 500 parts of demineralized water were added and the pH was brought to 8-8,6 with 12,5% v/v aqueous ammonia. After cooling to 25° C. and mixing for 30 minutes, 5 parts of CDH were added, rinsed with 20 parts of demineralized water and mixed for a further 5 minutes.

The molar ratio of hydrazide to carbonyl groups is 0.82, the number average molecular weight as determined by gel permeation chromatography was 1.93E3 Da and the calculated acid value (AV) amounted to 99 mg KOH/g solids. This results in an $M_n$/AV ratio of 19.

Initial viscosity measurement yields a value of 2.8E3 mPa·s, and after aging at 50° C. for 10 days a value of 4.0E4 mPa·s is measured, which indicates the end of pot life.

The invention claimed is:
1. A one-pack aqueous coating composition comprising dispersed particles of carbonyl functional vinyl polymer(s), wherein the coating composition further comprises carbodihydrazide, whereby
   (i) the equivalent molar ratio of hydrazide groups to carbonyl groups is from 0.1 to 0.95,
   (ii) the ratio of number-average molecular weight of the carbonyl functional vinyl polymer(s) to acid value of the carbonyl functional vinyl polymer(s) is higher than 400, and
   (iii) the acid value of the carbonyl functional vinyl polymer(s) is from 2 to 100 mg KOH/gram carbonyl functional vinyl polymer.

2. The coating composition according to claim 1, wherein the equivalent molar ratio of hydrazide groups to carbonyl groups is from 0.2 to 0.95.

3. The coating composition according to claim 1, wherein the ratio of number-average molecular weight of the carbonyl functional vinyl polymer(s) to acid value of the carbonyl functional vinyl polymer(s) is higher than 600.

4. The coating composition according to claim 1, wherein the coating composition comprises carbodihydrazide in an amount of less than 3 wt. % and higher than 0.5 wt. %, relative to the total amount of monomers charged for the preparation of the carbonyl functional vinyl polymer(s).

5. The coating composition according to claim 1, wherein the redox potential of the aqueous colloidal dispersion of the carbonyl functional vinyl polymer(s) prior to the addition of the carbodihydrazide is <+90 mV at pH 7.

6. The coating composition according to claim 1, wherein the redox potential of the coating composition after addition of the carbodihydrazide is <+32.5 mV at pH 7.

7. The coating composition according to claim 1, wherein the particles of carbonyl functional vinyl polymer(s) are obtained by emulsion polymerisation.

8. The coating composition according to claim 1, wherein the particles of carbonyl functional vinyl polymer(s) are obtained by emulsion polymerisation of a monomer mixture comprising carbonyl functional olefinically unsaturated monomer(s), carboxylic acid functional olefinically unsaturated monomer(s) and other olefinically unsaturated monomer(s) to form a copolymer, optionally neutralizing the copolymer with base, and adjusting the pH to a value of at least 6.8.

9. The coating composition according to claim 1, wherein the pH of the coating composition is above 7.

10. The coating composition according to claim 1, wherein the particles of carbonyl functional vinyl polymer(s) are ketone functional vinyl polymer particles.

11. The coating composition according to claim 8, wherein the carbonyl group containing olefinically unsaturated monomers is diacetone acrylamide.

12. The coating composition according to claim 8, wherein the carboxylic acid functional olefinically unsaturated monomer(s) is methacrylic acid and/or acrylic acid.

13. The coating composition according to claim 1, wherein the carbonyl functional vinyl polymer is a copolymerization reaction product of a monomer mixture comprising from 70 to 98 weight % of styrene, acrylonitrile and/or alkyl(meth)acrylate monomers where the alkyl has a chain length of 1-11 carbons, based on the total amount of monomers used to prepare the carbonyl functional vinyl polymer.

14. The coating composition according to claim 1, wherein the carbonyl functional vinyl polymer is a copolymerization reaction product of a monomer mixture consisting of (i) diacetone acrylamide, (ii) (meth)acrylic acid and/or betacarboxyethylacrylate, (iii) styrene, acrylonitrile and/or alkyl(meth)acrylate monomers where the alkyl has a chain length of 1-11 carbons and (iv) optionally other monomers, where the total amount of other monomers is less than 5 weight %, based on the total amount of monomers used to prepare the carbonyl functional vinyl polymer.

15. The coating composition according to claim 1, wherein the carbonyl functional vinyl polymer(s) have an average glass transition temperature which is in a range of from 5 to 60° C.

16. The coating composition according to claim 1, wherein the coating composition comprises from 0.1 to 8 wt. % of a surfactant based on total amount of monomers charged for the preparation of the carbonyl functional vinyl polymer(s).

17. A method for preparing the one-pack aqueous coating composition according to claim 1, the method comprising mixing the carbodihydrazide and the aqueous colloidal polymeric dispersion, to thereby obtain the one-pack aqueous coating composition having an equivalent molar ratio of hydrazide groups to carbonyl groups from 0.1 to 0.95, the ratio of number-average molecular weight of the carbonyl functional vinyl polymer(s) to acid value of the carbonyl functional vinyl polymer(s) of higher than 400, and the acid value of the carbonyl functional vinyl polymer(s) from 2 to 100 mg KOH/gram carbonyl functional vinyl polymer.

18. A method of coating a substrate, wherein the which method comprises:
  (i) applying the one-pack aqueous coating composition according to claim 1 to a substrate to form a coating thereof on the substrate,
  (ii) causing or allowing an aqueous carrier medium of the composition to be removed, and
  (iii) developing crosslinking of the coating applied to the substrate.

19. The method according to claim 18, wherein step (i) comprises applying the one-pack aqueous coating composition by printing.

20. A crosslinked coating obtained by:
  (i) applying the one-pack aqueous coating composition according to claim 1 to a substrate to form a coating thereof on the substrate,
  (ii) causing or allowing an aqueous carrier medium of the composition to be removed, and
  (iii) forming the cross-linked coating by developing crosslinking of the coating applied to the substrate.

21. The cross-linked coating according to claim 20, wherein the substrate is selected from the group consisting of:
  a) plastic films selected from polypropylene, polyethylene, polyester, polyamide, PVC, polycarbonate, polystyrene, polyurethane, PET, biaxially oriented polypropylene and biaxially oriented PET plastic films,
  b) leather, artificial leather, woven and non-woven fabrics of natural or synthetic materials, such as cotton, wool and rayon,
  c) metal substrates,
  d) wood,
  e) paper, and
  g) a combination of a), b), c), d) and/or e).

22. The cross-linked coating according to claim 20, wherein the coating is an overprint varnish or an ink.

\* \* \* \* \*